(12) United States Patent
Kato et al.

(10) Patent No.: US 7,028,386 B2
(45) Date of Patent: Apr. 18, 2006

(54) ROTOR BODY AND PRODUCTION METHOD THEREOF

(75) Inventors: Takashi Kato, Kanagawa (JP); Haruyoshi Kumura, Kanagawa (JP); Masaki Nakano, Yokohama (JP); Toshikazu Oshidari, Kanagawa (JP); Yuji Gotou, Yokohama (JP); Hirofumi Shimizu, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 29 days.

(21) Appl. No.: 10/475,296

(22) PCT Filed: Mar. 28, 2003

(86) PCT No.: PCT/JP03/03918

§ 371 (c)(1),
(2), (4) Date: Oct. 21, 2003

(87) PCT Pub. No.: WO03/084030

PCT Pub. Date: Oct. 9, 2003

(65) Prior Publication Data

US 2004/0130235 A1    Jul. 8, 2004

(30) Foreign Application Priority Data

Apr. 1, 2002 (JP) .............................. 2002-098672

(51) Int. Cl.
*H02K 15/10* (2006.01)

(52) U.S. Cl. ............................ 29/598; 29/596; 29/609; 310/261

(58) Field of Classification Search ................ 29/596, 29/597, 598, 607, 608, 609; 310/216, 217, 310/261

See application file for complete search history.

(56) References Cited

U.S. PATENT DOCUMENTS

| 4,339,874 | A | | 7/1982 | Mc'Carty et al. |
| 4,900,945 | A | * | 2/1990 | Isozumi et al. ............... 290/48 |
| 5,398,404 | A | * | 3/1995 | Meyer et al. .................. 29/732 |
| 6,345,433 | B1 | * | 2/2002 | Kliman et al. ................ 29/598 |
| 6,772,503 | B1 | * | 8/2004 | Fathimulla et al. ........... 29/598 |
| 2001/0005104 | A1 | | 6/2001 | Nakahara et al. |

FOREIGN PATENT DOCUMENTS

| JP | 7-135754 | A | | 5/1995 |
| JP | 8-290265 | | * | 5/1996 |
| JP | 8-290265 | A | | 11/1996 |
| JP | 10-174327 | A | | 6/1998 |
| JP | 2001-008392 | A | | 1/2001 |
| JP | 2001-238380 | A | | 8/2001 |
| WO | WO 96/42132 | A1 | | 12/1996 |

* cited by examiner

*Primary Examiner*—Darren Schuberg
*Assistant Examiner*—Leda Pham
(74) *Attorney, Agent, or Firm*—Foley & Lardner LLP

(57) ABSTRACT

A rotor body according to the present invention comprises an annular laminated core of electromagnetic steel sheets defining therein a plurality of apertures in which permanent magnets are to be fixed, respectively, and a cylindrical core support to support the core, wherein the laminated core and the core support are joined to each other by brazing.

3 Claims, 4 Drawing Sheets

CUTTING — LAMINATION OF CORE PIECES — ASSEMBLING OF CORE, CORE SUPPORT AND BRAZING MATERIAL — ANNEALING+JOINING

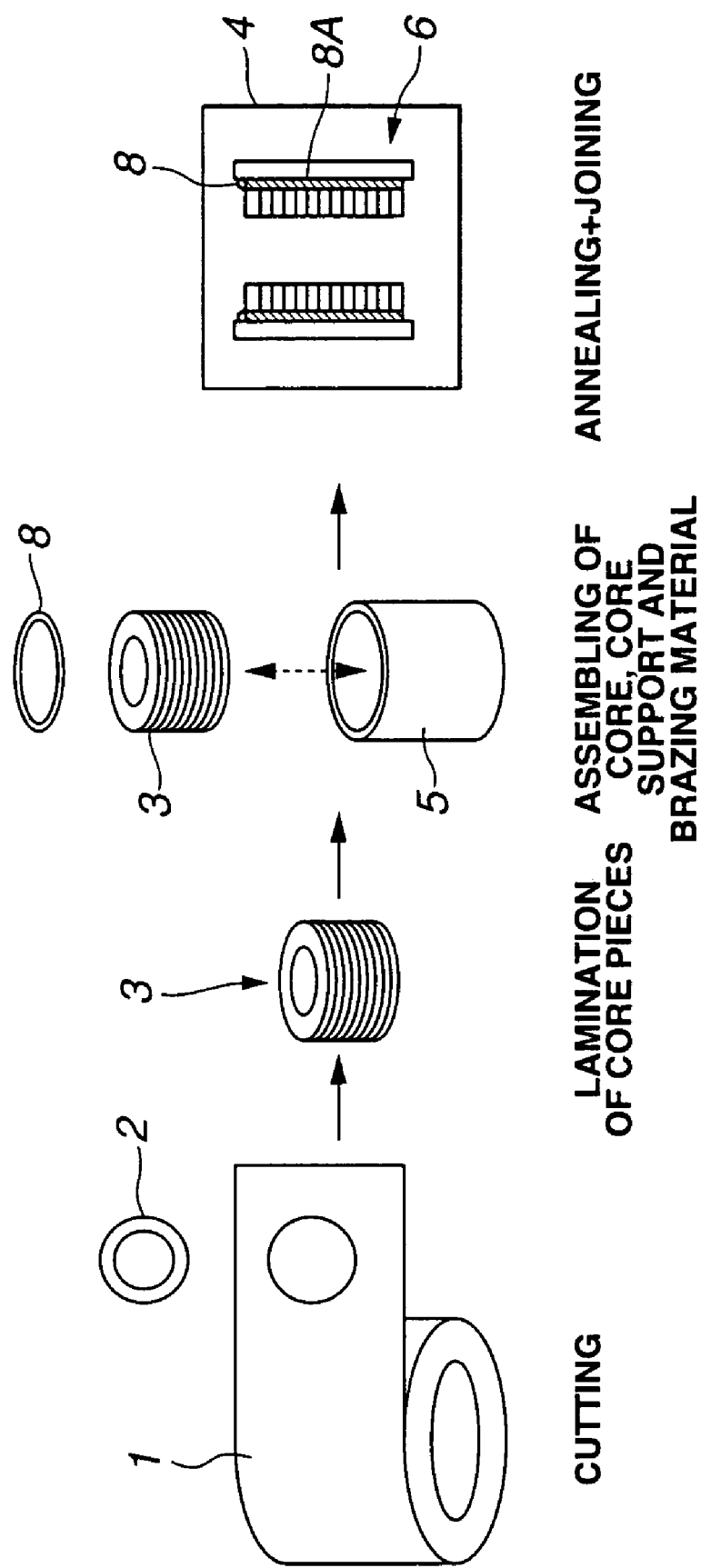

ROTOR BODY AND PRODUCTION METHOD THEREOF

BACKGROUND OF THE INVENTION

The present invention relates to a rotor body and a production method thereof.

A rotor body for a permanent-magnet motor has an annular laminated core of electromagnetic steel sheets to carry thereon a plurality of permanent magnets and a cylindrical core support. The laminated core and the core support are integral with each other so as to rotate about an axis as a single unit under the interaction of the permanent magnets with a stator and to thereby produce a torque.

SUMMARY OF THE INVENION

The present invention is to provide a rotor body of the above-mentioned type, which can be produced efficiently at low cost while being improved in strength, and a production method thereof.

According to an aspect of the present invention, there is provided a rotor body, comprising: an annular laminated core of electromagnetic steel sheets defining therein a plurality of apertures in which permanent magnets are to be fixed, respectively; and a cylindrical core support to support the core, the laminated core and the core support being joined to each other by brazing.

According to another aspect of the present invention, there is provided a rotor body, comprising: an annular laminated core of electromagnetic steel sheets; a cylindrical core support to support the laminated core; and a brazing material provided between the laminated core and the core support to join the laminated core and the core support together.

According to still another aspect of the present invention, there is provided a method for producing a rotor body, comprising: providing a subassembly of an annular laminated core of electromagnetic steel sheets, a cylindrical core support and a brazing material meltable at or below a raised temperature; and heat treating the subassembly at the raised temperature to anneal the laminated core and the core support and to join the laminated core and the core support together by the brazing material.

BRIEF DESCRIPTION OF THE DRAWINGS

FIG. 3 is a schematic illustration of the production method of a rotor body according to an embodiment of the present invention.

DESCRIPTION OF THE EMBODIMENTS

Figure 1:
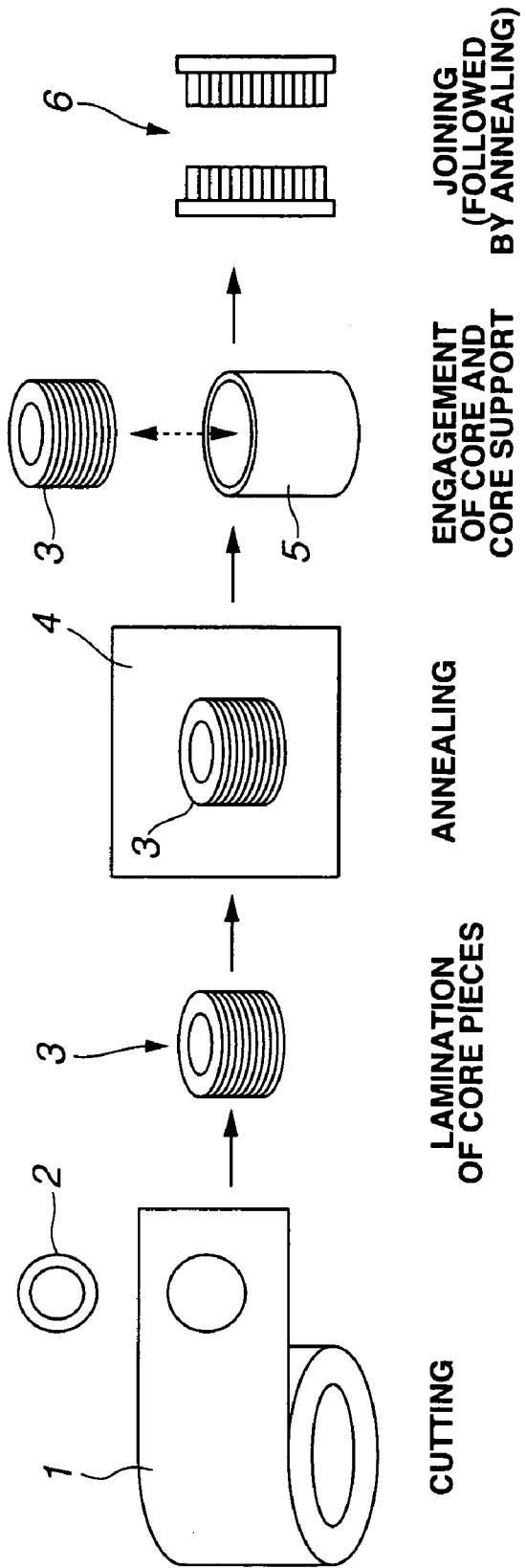
FIG. 1 is a schematic illustration of the production method of a rotor body according to the earlier technology.

The present invention will be described with reference to the drawings, in which like parts and portions are designated by the same reference numerals in the drawings.

Firstly, a rotor body and a production method thereof according to the earlier technology will be explained with reference to FIG. 1, in order to aid in understanding the present invention.

In the earlier technology, rotor body 6 is produced by the following procedure.

(1) Core pieces 2 are cut from a roll of electromagnetic steel sheet 1.

(2) Core pieces 2 are laminated and caulked together to form laminated core 3.

(3) Laminated core 3 is heat treated in annealing furnace 4 to relieve a residual stress resulting from the cutting and caulking of core pieces 2.

(4) Laminated core 3 and core support 5 are engaged with each other by press fit.

(5) Laminated core 3 and core support 5 are joined to each other by shrinkage fitting or using a key member to form rotor body 6.

(6) Rotor body 6 is then annealed to relieve a residual stress resulting from the press fitting of laminated core 3 and core support 5.

After that, permanent magnets are fixed in apertures of laminated core 3 of rotor body 6, respectively, to complete a rotor.

In a case where laminated core 3 and core support 5 are joined by shrinkage fitting, however, there is a need to assure high dimensional accuracies for proper engagement of laminated core 3 and core support 5, in order to allow laminated core 3 and core support 5 to rotate as a single unit and thereby produce a required torque and, at the same time, to control a surface stress developed on core support 5 when press fitted with laminated core 3 to within acceptable material levels for core support material. Such precision processing or finish processing increases in production time and cost.

In a case where the key member is used to join laminated core 3 and core support 5 together, there is a need to form keyholes in both of laminated core 3 and core support 5. However, the strength of laminated core 3 and core support 5 becomes lowered due to decreases in material dimension in and around the keyholes. In addition, the insertion of the key member into the keyholes causes a relatively large pressure so that the maximum rotor revolution number becomes limited to withstand a stress resulting from rotor centrifugal force. It is further difficult to achieve a rotor revolution balance in the presence of the key member.

In view of the foregoing, the present invention has been made to provide a rotor body that can be produced at low cost by assembling and joining its laminated core and core support together efficiently in a short time while attaining a favorable strength.

Hereinafter, a rotor body and a production method thereof according to the present invention will be described below with reference to FIGS. 2, 3, 4A and 4B.

Figure 2:
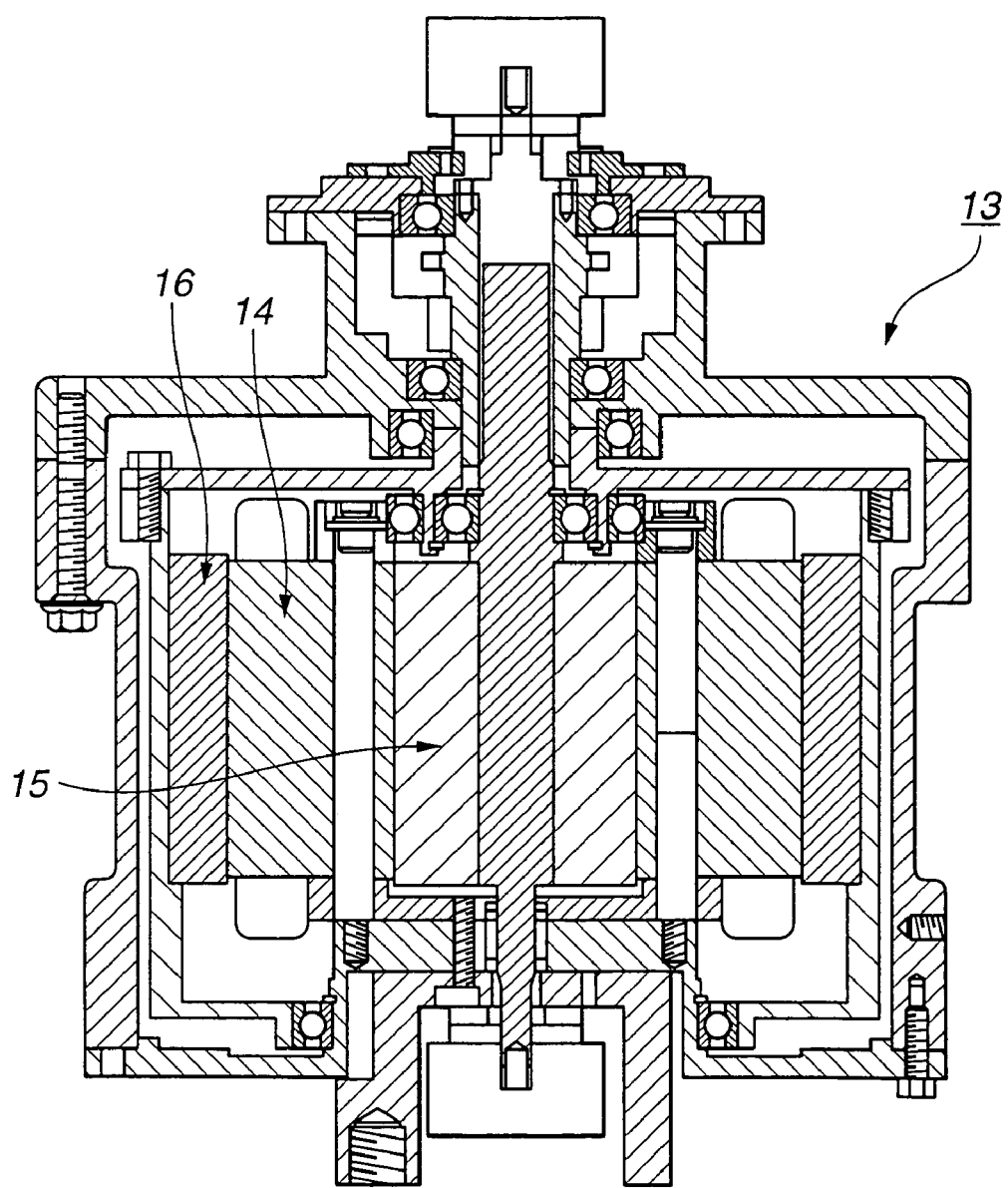
FIG. 2 is a sectional view of a motor with a rotor body according to an embodiment of the present invention.

Rotor body according to one embodiment of the present invention can be applied to inner and outer rotors 15 and 16 that are disposed coaxially with stator 14 in synchronous motor 13, respectively, as shown in FIG. 2. In each of inner and outer rotors 15 and 16, rotor body 6 carries a plurality of permanent magnets (not shown) thereon radially at regular intervals so as to rotate about an axis under the interaction between the permanent magnets and an electromagnet of stator 14 and thereby produce a torque. It should be noted that, although FIGS. 3, 4A and 4B each show rotor body 6 for use in outer rotor 16 by way of example, the same goes for rotor body 6 for use in inner rotor 15.

Rotor body 6 has annular laminated core 3 and cylindrical core support 5. Laminated core 3 has a plurality of ring-shaped core pieces 2 each made of electromagnetic steel sheets 1, and is formed with a plurality of apertures 9 in which the permanent magnets are to be fixed. Core support 5 is arranged to support laminated core 3. When rotor body 6 is used for inner rotor 15, core support 5 is press fitted into laminated core 3 so that the inner circumferential surface of laminated core 3 is held by the outer circumferential surface of core support 5. When rotor body 6 is used for outer rotor 16, core support 5 is press fitted around laminated core 3, as shown in FIGS. 3, 4A and 4B, so that the outer circumferential surface of laminated core 3 is held by the inner circumferential surface of core support 5.

Laminated core 3 and core support 5 are brazed to each other so as to rotate as a single unit. In other word, there is no need to use a fitting (such as a key member) to join laminated core 3 and core support 5 together and to form relatively large incisions for installing such a fitting in laminated core 3 and core support 5. This makes it possible to avoid stress concentration in laminated core 3 and core support 5 and thus increase a maximum rotor revolution number.

Figure 4A:
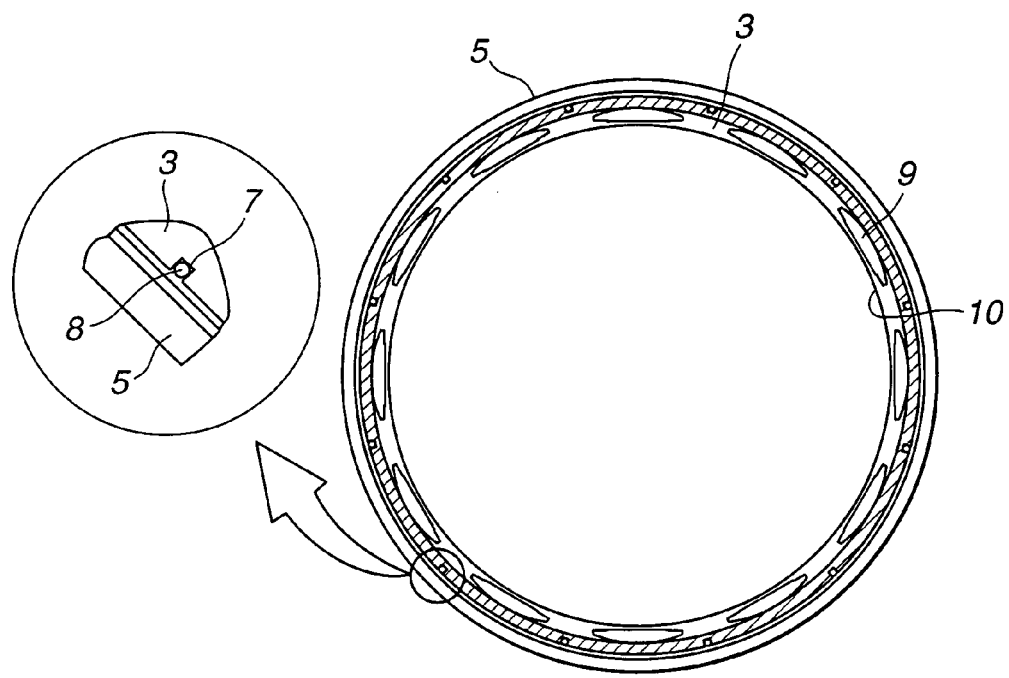
FIGS. 4A and 4B are sectional views of joints between laminated cores and core supports of rotor bodys according to embodiments of the present invention.
Figure 4B:
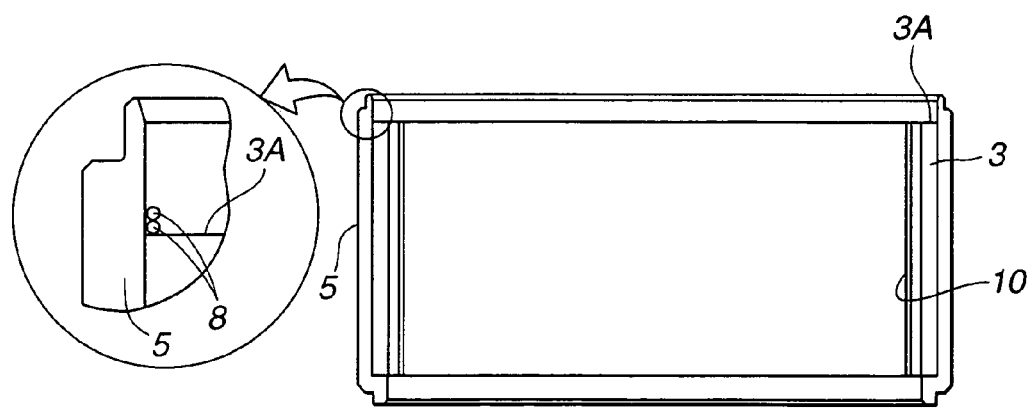

In the present invention, rotor body 6 is produced by the following procedure as shown in FIGS. 3, 4A and 4B.

(1) Ring-shaped core pieces 2 are cut from a roll of electromagnetic steel sheet 1 by e.g. punching.

(2) Core pieces 2 are laminated coaxially with each other and combined by e.g. caulking into annular laminated core 3.

(3) Laminated core 3, core support 5 and brazing material 8 are combined into a subassembly by engaging laminated core 3 and core support 5 with each other by press fit and placing brazing material 8 at a position between laminated core 3 and core support 5. More specifically, laminated core 3 and core support 5, after engaged together, are positioned in such a manner that the axis is orientated vertically. Then, one or more ring of brazing material 8 are stacked in layers on top edge 3A of laminated core 3 along the circumferential surface of core support 5 opposed to the circumferential surface of laminated core 3, as shown in FIG. 4B. The number of rings of brazing material 8 stacked is determined so as to allow brazing material 8 to become spread uniformly in joint 8A between the opposed circumferential surfaces of laminated core 3 and core support 5 in a subsequent step.

(4) The subassembly of laminated core 3, core support 5 and brazing material 8 is heat treated at a raised temperature in annealing furnace 4. Brazing material 8 is meltable at or below the raised temperature so that, in the heat treatment, laminated core 3 and core support 5 are not only annealed to relieve a residual stress resulting from the cutting of core pieces 2 from electromagnetic steel sheet 1, the caulking of core pieces 2 and the press fitting of laminated core 3 and core support 5 but also joined to each other by brazing material 8. It takes only a single process step in the present invention to anneal and join laminated core 3 and core support 5, although it has taken several process steps in the earlier technology. Laminated core 3 and core support 5 are joined together at an increased strength, as brazing material 8 is melt and flows down to be distributed uniformly in joint 8A between laminated core 3 and core support 5 during the heat treatment. Further, laminated core 3 and core support 5 can be joined properly by brazing material 8 even when processed with some tolerances, and laminated core 3 and core support 5 do not need so high dimensional accuracies for their respective engaging portions in the present invention as needed in the earlier technology.

As described above, it is therefore possible to simplify the production process of rotor body 6 and to reduce production time and cost significantly, so that rotor body 6 can be produced from laminated core 3 and core support 5 efficiently at low cost while assuring an improved strength.

Alternatively, laminated core 3 can be formed with a plurality of axially extending, evenly spaced cuts 7 so as to define spaces between laminated core 3 and core support 5. Cuts 7 are formed in the outer circumferential surface of laminated core 3 as shown in FIG. 4A when rotor body 6 is used for outer rotor 16. On the other hands, cuts 7 are formed in the inner circumferential surface of laminated core 3 when rotor body 6 is used for inner rotor 15. In this case, wire-shaped brazing material 8 is inserted in each of the spaces between laminated core 3 and core support 5 while or after laminated core 3 and core support 5 are engaged with each other. Then, the subassembly of laminated core 3, core support 5 and brazing material 8 is heat treated to anneal and braze laminated core 3 and core support. As brazing material 8 is distributed uniformly in the spaces between laminated core 3 and core support 5 without axial variations, laminated core 3 and core support 5 can be also joined at an increased strength.

After rotor body 6 is completed, the permanent magnets are fixed in apertures 9 of rotor body 6 to complete rotor 15 or 16.

The entire contents of Japanese Patent Application No. 2002-098672 (filed on Apr. 1, 2002) are herein incorporated by reference.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

The invention claimed is:

1. A method for producing a rotor body, comprising:
providing a subassembly of an annular laminated core of electromagnetic steel sheets, a cylindrical core support and a brazing material meltable at or below a raised temperature; and
heat treating the subassembly at the raised temperature to anneal the laminated core and the core support and to join the laminated core and the core support together by the brazing material, and
wherein the laminated core is formed with axially extending and spaced cuts, and said providing includes engaging the laminated core and the core support with each other so that the cuts define spaces between the laminated core and the core support and inserting wires of brazing material into the respective spaces between the laminated core and the core support.

2. A method according to claim 1, wherein
the cuts are formed in an outer circumferential surface of the laminated core, and the laminated core is engaged in the core support.

3. A method according to claim 1, wherein the spaced cuts are evenly spaced cuts.

* * * * *